(12) United States Patent
Sumi (10) Patent No.: US 7,122,831 B2
(45) Date of Patent: Oct. 17, 2006

(54) METHOD OF FORMING A REFLECTIVE ELECTRODE AND A LIQUID CRYSTAL DISPLAY DEVICE

(75) Inventor: Naoki Sumi, Kobe (JP)

(73) Assignee: TPO Displays Corp., Miao Li County (TW)

( * ) Notice: Subject to any disclaimer, the term of this patent is extended or adjusted under 35 U.S.C. 154(b) by 53 days.

(21) Appl. No.: 10/928,867

(22) Filed: Aug. 27, 2004

(65) Prior Publication Data

US 2005/0029517 A1 Feb. 10, 2005

Related U.S. Application Data

(62) Division of application No. 10/188,762, filed on Jul. 3, 2002, now Pat. No. 6,815,347.

(30) Foreign Application Priority Data

Jul. 9, 2001 (JP) ............................. 2001-208502

(51) Int. Cl.
*H01L 29/04* (2006.01)
*H01L 29/10* (2006.01)
*H01L 31/036* (2006.01)
*H01L 31/0376* (2006.01)
*H01L 31/20* (2006.01)

(52) U.S. Cl. .................... 257/59; 257/57; 257/66; 257/72; 257/222; 257/291; 257/E29.04; 257/E29.147; 257/E29.151; 257/E31.101

(58) Field of Classification Search ........... 257/57, 257/59, 72, 222, 291, 66, E29.04, E29.147, 257/E29.151, E31.101
See application file for complete search history.

(56) References Cited

U.S. PATENT DOCUMENTS

| 5,526,149 A | * | 6/1996 | Kanbe et al. ............... 349/113 |
| 5,579,142 A | * | 11/1996 | Sawayama et al. ......... 349/177 |
| 5,610,741 A | * | 3/1997 | Kimura ...................... 349/113 |
| 5,691,791 A | * | 11/1997 | Nakamura et al. .......... 349/113 |
| 5,734,457 A | * | 3/1998 | Mitsui et al. ............... 349/106 |
| 5,926,242 A | * | 7/1999 | Kataoka et al. ............. 349/117 |
| 5,973,843 A | * | 10/1999 | Nakamura ................... 359/619 |
| 6,064,456 A | * | 5/2000 | Taniguchi et al. .......... 349/113 |
| 6,172,728 B1 | | 1/2001 | Hiraishi ...................... 349/139 |
| 6,262,783 B1 | * | 7/2001 | Tsuda et al. .................. 349/39 |
| 6,327,009 B1 | * | 12/2001 | Ichimura .................... 349/113 |
| 6,330,047 B1 | * | 12/2001 | Kubo et al. ................. 349/147 |
| 6,341,002 B1 | * | 1/2002 | Shimizu et al. ............. 349/119 |
| 6,373,540 B1 | * | 4/2002 | Munakata ................... 349/117 |

(Continued)

OTHER PUBLICATIONS

Yamaguichi et al: "20.2: A Simple Reflective TFT-LCD Fabrication Using Four Photomask Processes" 1998 SID International Symposium Digest Of Technical Papers. vol. 29, May 17, 1998, pp. 297-300.

*Primary Examiner*—Ida M. Soward
(74) *Attorney, Agent, or Firm*—Birch, Stewart, Kolasch & Birch, LLP.

(57) ABSTRACT

The present invention provides a method of forming a TFT and a reflective electrode having recesses or projections with reduced manufacturing cost and a reduced number of manufacturing steps, and provides a liquid crystal display device to which the method is applied. A photosensitive film 8 is formed on a metal film 7. Then, remaining portions 81, 82 and 83 are formed from the photosensitive film 8. Then, the metal film 7 is etched by using the remaining portions 81, 82 and 83 as masks. And then, a photosensitive film 9 and a reflective electrode film 10 are formed without removing the remaining portions 81, 82 and 83.

12 Claims, 9 Drawing Sheets

U.S. PATENT DOCUMENTS

| | | |
|---|---|---|
| 6,407,431 B1 * | 6/2002 | Yamazaki et al. .......... 257/353 |
| 6,407,784 B1 * | 6/2002 | Kanou et al. ............... 349/113 |
| 6,424,399 B1 * | 7/2002 | Shimada et al. ............ 349/147 |
| 6,466,286 B1 * | 10/2002 | Seo ............................ 349/113 |
| 6,614,496 B1 * | 9/2003 | Song et al. ................. 349/114 |
| 2002/0001047 A1 * | 1/2002 | Park et al. .................... 349/43 |
| 2004/0070709 A1 * | 4/2004 | Kanou et al. ............... 349/113 |

* cited by examiner

PRIOR ART

FIG.14

METHOD OF FORMING A REFLECTIVE ELECTRODE AND A LIQUID CRYSTAL DISPLAY DEVICE

This application is a Divisional of U.S. patent application Ser. No. 10/188,762, filed on 3 Jul. 2002, now U.S. Pat. No. 6,815,347.

BACKGROUND OF THE INVENTION

1. Field of the Invention

The present invention relates to a method of forming a thin film transistor (TFT) and a reflective electrode having recesses or projections in a predetermined area and also to a liquid crystal display device to which the method is applied.

2. Description of Related Art

In recent years, a liquid crystal display device provided with TFTs has been widespread rapidly. When the liquid crystal display device is constructed as a reflective type or a transflective type, not only a TFT but also a reflective electrode for reflecting an outer light are provided in each pixel area. In the liquid crystal display device provided with the reflective electrode, the reflective electrode is often provided with recesses or projections in order to improve a quality of the image to be displayed.

For example, In the case where the TFT provided in each pixel area has the top gate structure, the gate electrode is formed by performing a lithographic step before forming the reflective electrode. Next, a photosensitive film is formed and is patterned into a shape having a number of recesses or projections and then a reflective electrode is formed thereon. A lithographic step comprises a plurality of steps including an exposure step, a development step and others. Therefore, in the case where, after forming the gate electrode by performing the lithographic step, the photosensitive film is formed and then patterned into the shape with a number of recesses or projections, there arises a problem that the number of manufacturing steps and the manufacturing costs increase.

SUMMARY OF THE INVENTION

It is therefore an object of the present invention is to provide a method of forming a TFT and a reflective electrode comprising recesses or projections with a reduced number of manufacturing steps and reduced costs and a liquid crystal display device to which such method is applied.

A method of the present invention for achieving the object described above is a method of forming a TFT and a reflective electrode having recesses or projections in a predetermined area, the method forming at least a gate electrode and a gate bus by processing a first film, the method comprising the step of forming the first film, the step of forming a photosensitive film on the first film, the step of patterning the photosensitive film in such a way that a first portion, a second portion and a third portion of the photosensitive film remain, the first portion corresponding to the gate electrode, the second portion corresponding to the gate bus and the third portion being different from the first and second portions, the step of etching the first film by using the first, second and third portions as masks and the step of forming the reflective electrode in such a way that at least a portion of the reflective electrode is present on at least the third portion of the first, second and third portions.

According to the present invention, in the step of patterning a photosensitive film, the photosensitive film is patterned in such a way that the first, second and third portions of the photosensitive film remain (the first portion corresponds to the gate electrode, the second portion corresponds to the gate bus and the third portion is different from the first and second portions). Further, in the etching step, the first film is etched using the first, second and third portions of the photosensitive film as etching masks, so that gate electrodes and gate buses can be formed from the first film. After that, in the step of forming a reflective electrode, the reflective electrode is formed without removing the first, second and third portions. Therefore, the shape of the reflective electrode can be adjusted depending on the shape of the first, second and third portions, so that it is possible to provide the reflective electrode with recesses or projections.

As described above, in the present invention, the photosensitive film is used as etching masks for forming the gate electrode and the gate bus and is also used to provide the reflective electrode with the recesses or projections. That is to say, a member used as etching masks for forming the gate electrode and the gate bus and another member for providing the reflective electrode with the recesses or projections are formed from the same photosensitive film. Therefore, there is no need to form, from different photosensitive films, a member used as etching mask for forming the gate electrode and the gate bus and another member for providing the reflective electrode with the recesses or projections, so that the number of manufacturing steps and the manufacturing costs will be reduced.

In the present invention, the third portion may comprise a plurality of parts scattered in the predetermined area or comprise a plurality of holes in the predetermined area.

By constructing the third portion described above, the reflective electrode can be provided with recesses or projections Further, in the present invention, an edge of the second portion may comprise a curved form.

By providing the edge of the second portion with the curved form, the reflective characteristics of the reflective electrode can be further improved.

A liquid crystal display device of the present invention is a liquid crystal display device comprising a substrate on which a TFT and a reflective electrode having recesses or projections are formed in a predetermined area, wherein the reflective electrode is formed by using the method as claimed in any one of claims 1 to 4.

Further, in the liquid crystal display device of the present invention, the third portion can be present below the reflective electrode and a material of the first film can be present below the third portion.

Furthermore, in the liquid crystal display device of the present invention, an edge of at least that portion of the gate bus, which is located below the reflective electrode, may comprise a curved form.

The invention further relates to a substrate on which a TFT and a reflective electrode having recesses or projections are formed in a predetermined area, the substrate further comprising:

a first film patterned to comprise a first portion, a second portion and a third portion, the first portion forming a gate electrode of the TFT, the second portion forming a gate bus, the third portion being different from the first and the second portion, and at least the third portion being formed in the predetermined area;

provided on the substrate provided with the first film, a photosensitive film patterned to comprise a first photosensitive portion, a second photosensitive portion and a third photosensitive portion, the first portion being masked by and aligned with the first photosensitive portion, the second portion being masked by and aligned with the second photosensitive portion, and the third portion being masked by and aligned with the third photosensitive portion;

provided on the substrate provided with the photosensitive film, a reflective electrode covering at least the third photosensitive portion of said first, second and third photosensitive portions and an area of the substrate adjacent the third photosensitive portion to form the reflective electrode having recesses or projections in a predetermined area and a liquid crystal display device comprising such.

DESCRIPTION OF THE PREFERRED EMBODIMENT(S)

Hereinafter, an embodiment of the present invention will be described.

Figure 1:
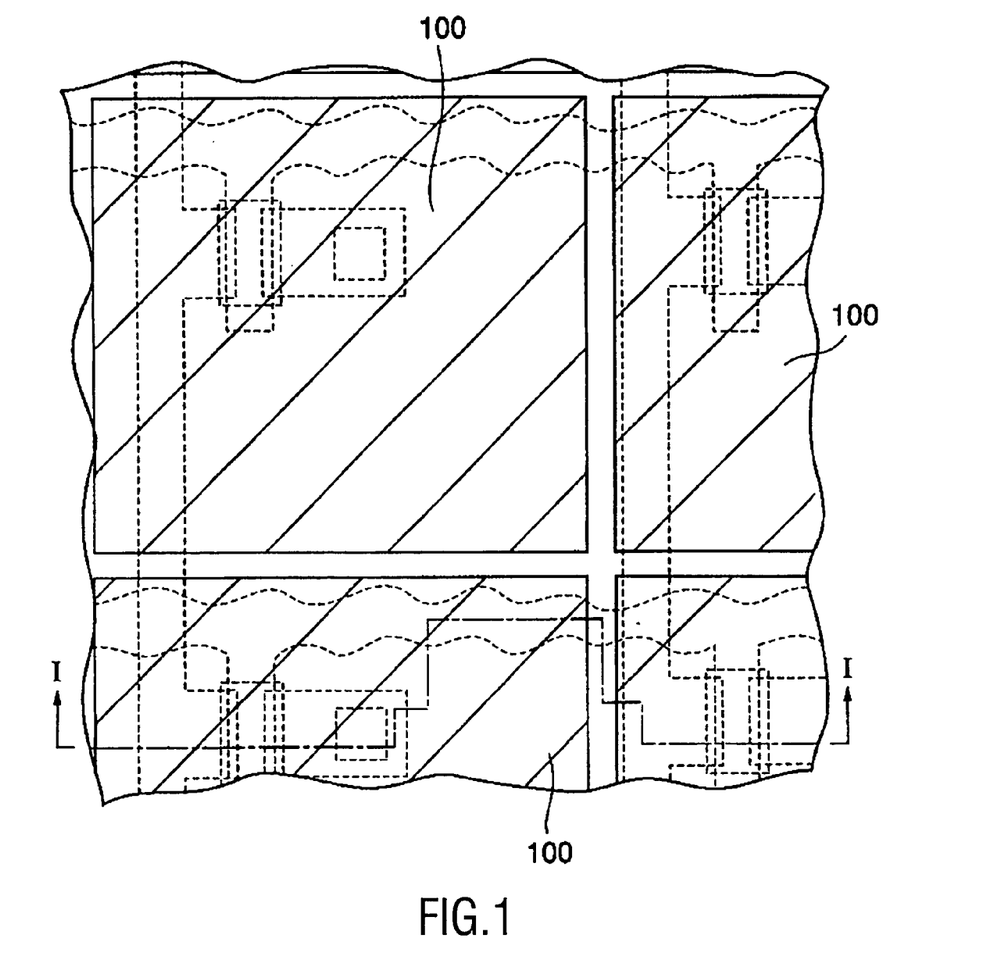
FIG. 1 is a plan view of a TFT substrate assembly in which TFTs and reflective electrodes have been formed in accordance with an embodiment of the method according to the present invention.
Figure 2:
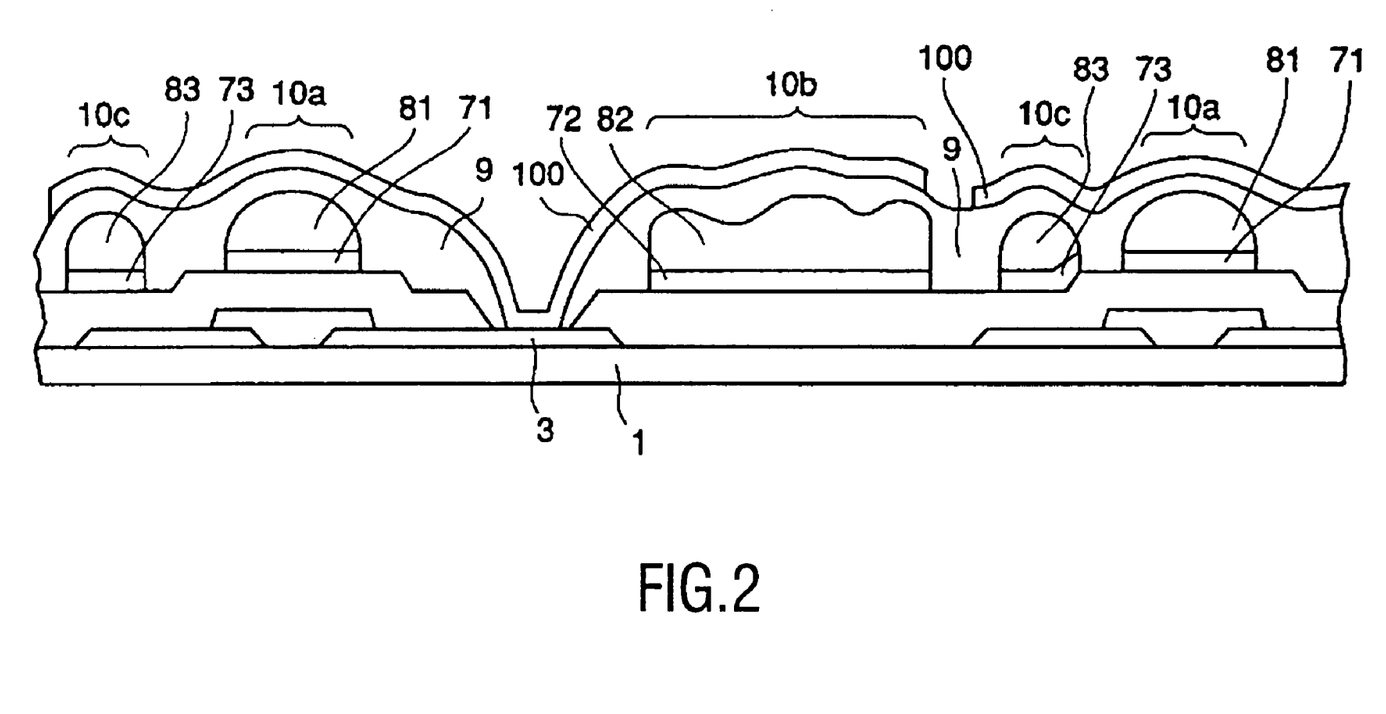
FIG. 2 is a cross-sectional view of the assembly taken along a line I—I of FIG. 1.

FIG. 1 is a plan view of a TFT substrate assembly in which TFTs and reflective electrodes have been formed in accordance with an embodiment of the method according to the present invention. FIG. 2 is a cross-sectional view of the assembly taken along a line I—I of FIG. 1.

Hereinafter, a method of manufacturing the TFT substrate assembly shown in FIGS. 1 and 2 will be described with reference to FIGS. 3 to 12.

Figure 3:
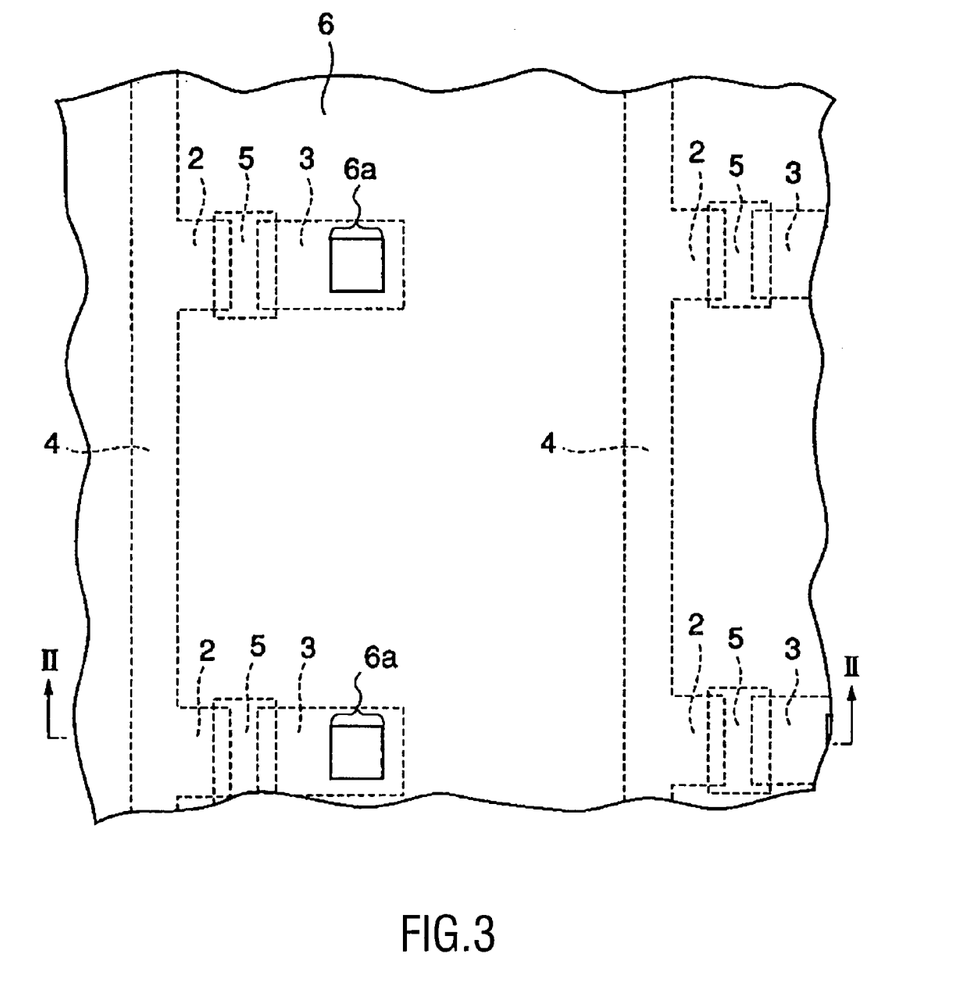
FIG. 3 is a plan view of a substrate immediately after a gate insulating film 6 has been formed thereon.
Figure 4:
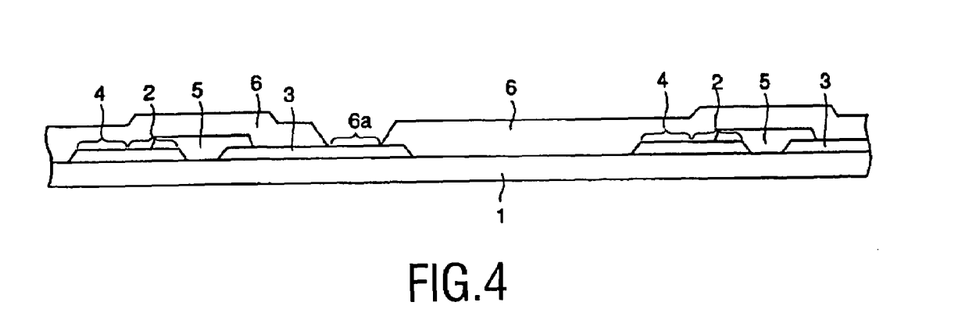
FIG. 4 is a cross-sectional view of the substrate taken along a line II—II of FIG. 3.

FIG. 3 is a plan view of a substrate immediately after a gate insulating film 6 has been formed thereon. FIG. 4 is a cross-sectional view of the substrate taken along a line II—II of FIG. 3.

As shown in FIG. 4, source electrodes 2, drain electrodes 3, source buses 4, semiconductor layers 5 of a-Si:H (hydrogenated amorphous silicon) for example and the gate insulating film 6 are formed on the substrate 1. A rectangular window 6a (see FIG. 3) for exposing a part of each drain electrode 3 is formed in the gate insulating film 6. After forming the gate insulating film 6, a metal film for the gate electrodes and gate buses is formed (see FIG. 5).

Figure 5:
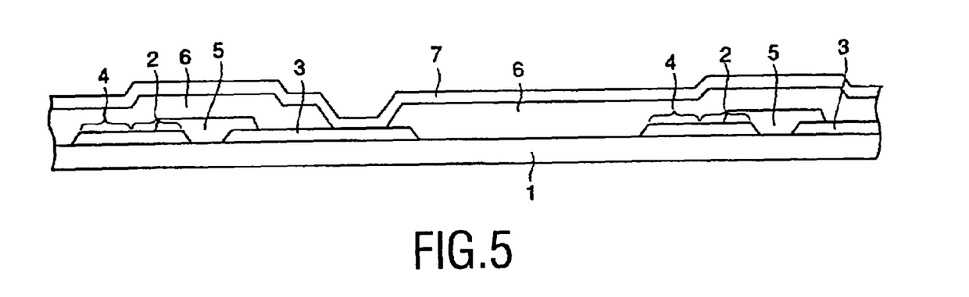
FIG. 5 is a cross-sectional view of the substrate on which the metal film has been formed.

FIG. 5 is a cross-sectional view of the substrate on which the metal film has been formed.

For example, an Al (aluminum) film can be used as the metal film 7. After forming the metal film 7, a photosensitive film is formed without patterning the metal film 7 (see FIG. 6).

Figure 6:
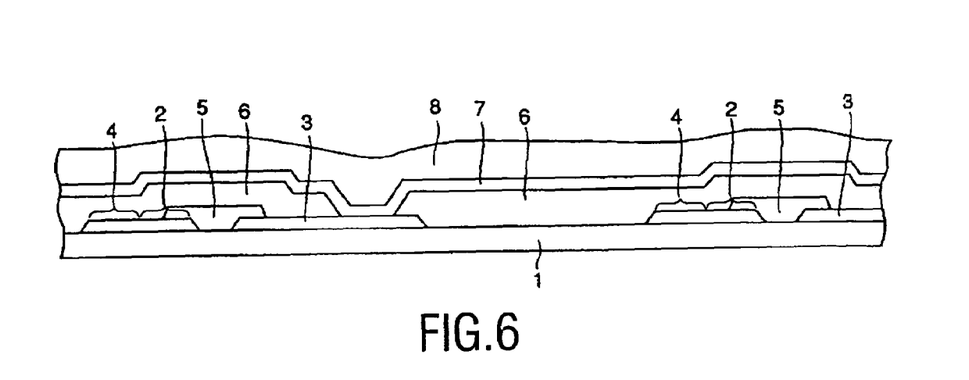
FIG. 6 is a cross-sectional view of the substrate on which the photosensitive film has been formed.

FIG. 6 is a cross-sectional view of the substrate on which the photosensitive film has been formed.

The photosensitive film 8 directly contacts the metal film 7 in this embodiment but a further film may be interposed between the photosensitive film 8 and the metal film 7. After forming the photosensitive film 8 as shown in FIG. 6, the photosensitive film 8 is patterned by exposing the photosensitive film 8 to light and developing it (see FIGS. 7 and 8).

Figure 7:
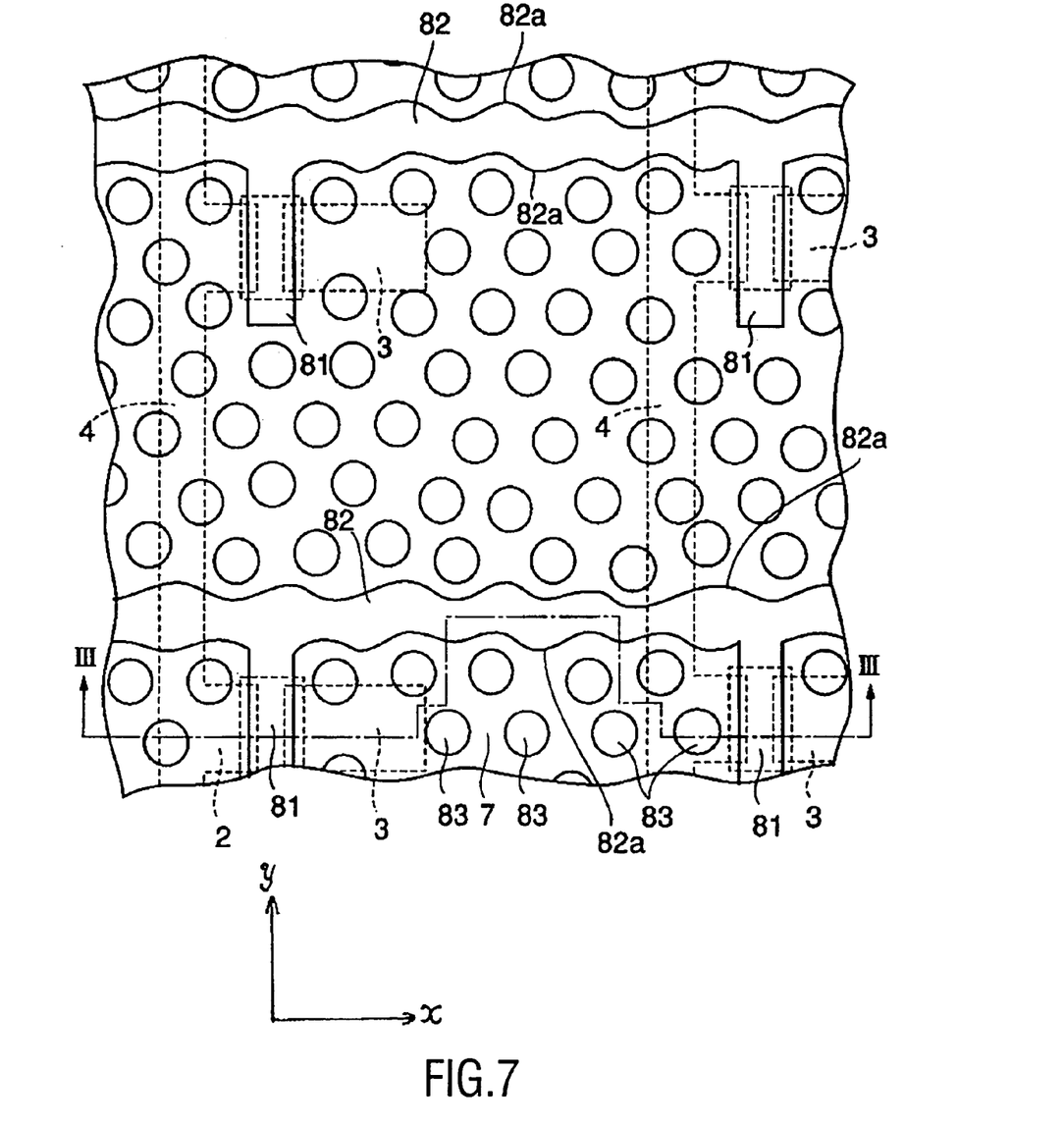
FIG. 7 is a plan view of the substrate after the photosensitive film 8 has been patterned.
Figure 8:
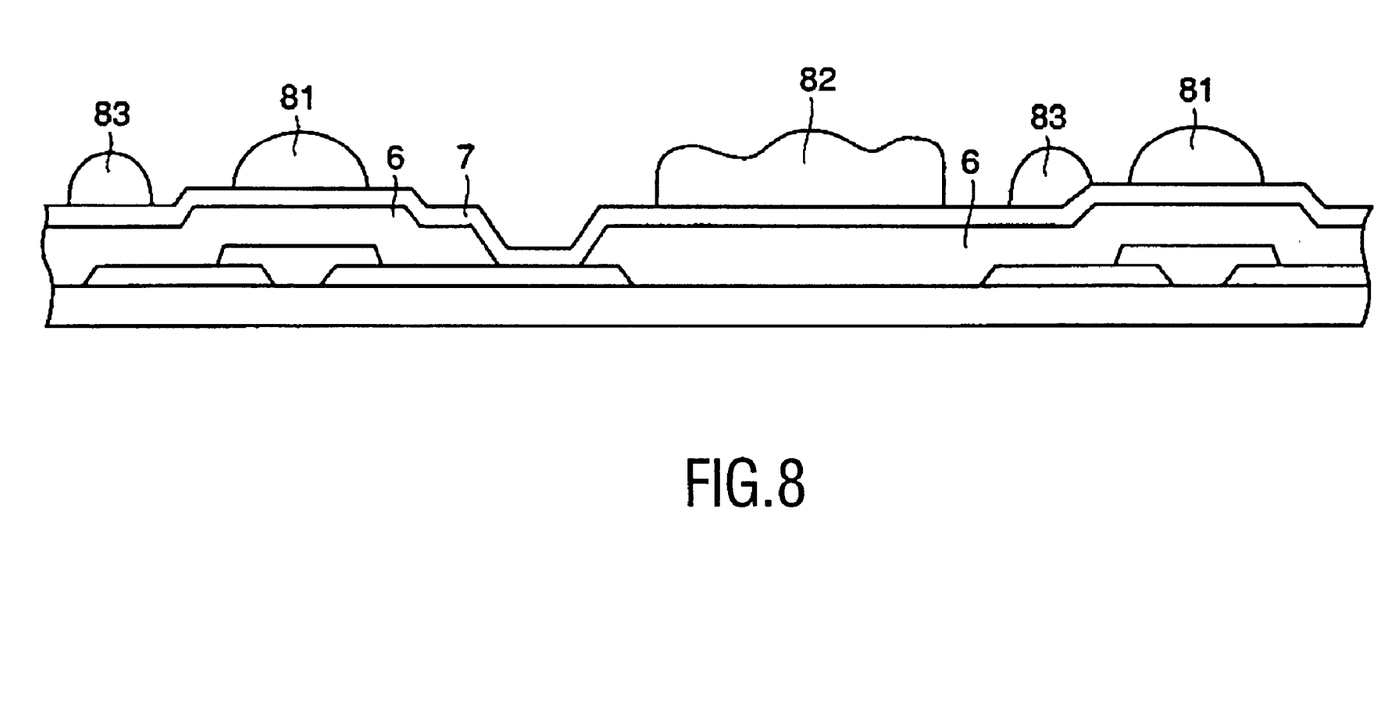
FIG. 8 is a cross-sectional view of the substrate taken along a line III—III of FIG. 7.

FIG. 7 is a plan view of the substrate after the photosensitive film 8 has been patterned. FIG. 8 is a cross-sectional view of the substrate taken along a line III—III of FIG. 7.

A part of the photosensitive film 8 is removed by developing the photosensitive film 8, so that portions 81, 82 and 83 remain. The portion 81 remains on a portion of the metal film 7 corresponding to the gate electrode 71 described later (see FIG. 10). The portion 81 remains so as to extend in a y direction (see FIG. 7). The portion 82 remains on a portion of the metal film 7 corresponding to the gate bus 72 described later (see FIG. 10). The portion 82 remains so as to extend in an x direction (see FIG. 7). Edges 82a of the remaining portion 82 are formed in the wavy shape in the plan view (see FIG. 7). The reason for forming the edges 82a in the wavy shape will be described later. The portions 81 and 82 remain connected to each other without being separated. The remaining portions 83 each have a generally hemispherical shape and are distributed on the substrate. The remaining portions 83 play a role in providing a reflective electrode 100 described later (see FIG. 2) with projections 10c. The portions 83 remain separated from the remaining portions 81 and 82. Next, the metal film 7 will be etched using the remaining portions 81, 82 and 83 as etching masks (see FIGS. 9 and 10).

Figure 9:
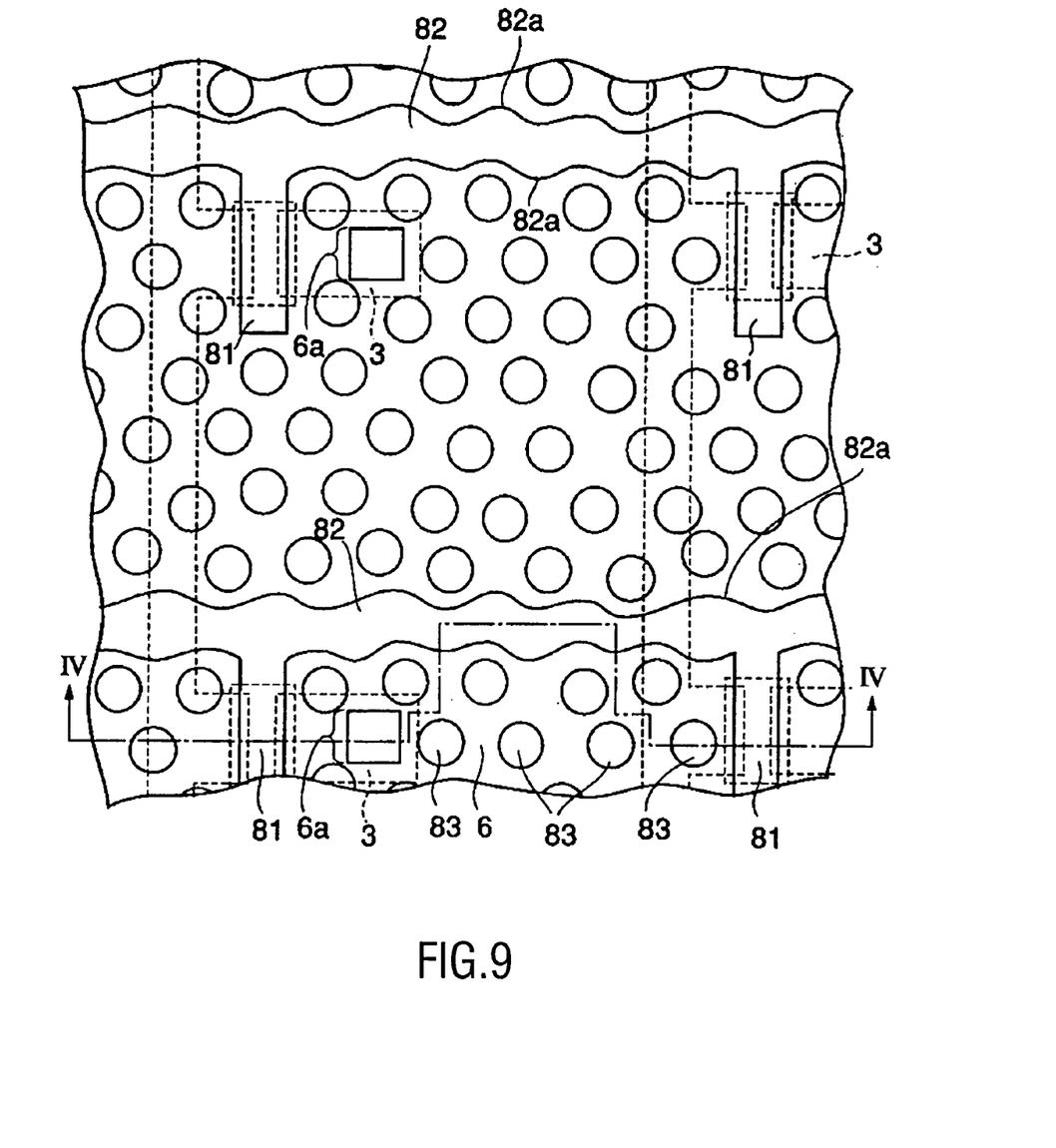
FIG. 9 is a plan view of the substrate after the metal film 7 has been etched.
Figure 10:
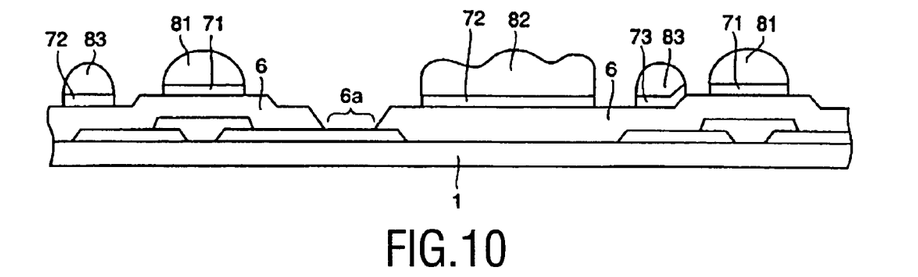
FIG. 10 is a cross-sectional view of the substrate taken along a line IV—IV of FIG. 9.

FIG. 9 is a plan view of the substrate after the metal film 7 has been etched. FIG. 10 is a cross-sectional view of the substrate taken along a line IV—IV of FIG. 9.

When the metal film 7 is etched, the gate electrode 71 is formed below the remaining portion 81 while the gate bus 72 is formed below the remaining portion 82 as shown in FIG. 10. Since the edges 82a of the remaining portion 82 have the wavy shape, edges of the gate bus 72 are also formed in the wavy shape. A metal piece 73 made of the material of the metal film 7 remains below each remaining portion 83. Since each remaining portion 83 is separated from the remaining portions 81 and 82, the metal piece 73 remaining below each remaining portion 83 is separated from the gate electrode 71 and the gate bus 72. In this way, the gate electrodes 71, the gate buses 72 and the metal pieces 73 are formed below the remaining portions 81, 82 and 83, respectively. In this embodiment, the portions 83 are remained in order to provide the reflective electrode 100 described later (see FIG. 2) with projections 10c. Therefore, when the metal film 7 is etched, the remaining portions 83 act as etching masks, so that a plurality of metal pieces 73 are formed. However, it should be noted that the remaining portions 83 are not remained in order to form the metal pieces 73 and that each metal piece 73 is a mere by-product which is formed because of the existence of the remaining portion 83 and the metal piece 73 does not contribute to the operation of the TFTs. In this embodiment, although only the gate electrodes 71, the gate buses 72 and metal pieces 73 are formed from the metal film 7, electrodes each for providing a respective pixel area with a storage capacitance may additionally be formed from the metal film 7.

After etching the metal film 7 as described above, a photosensitive film is formed (see FIG. 11).

Figure 11:
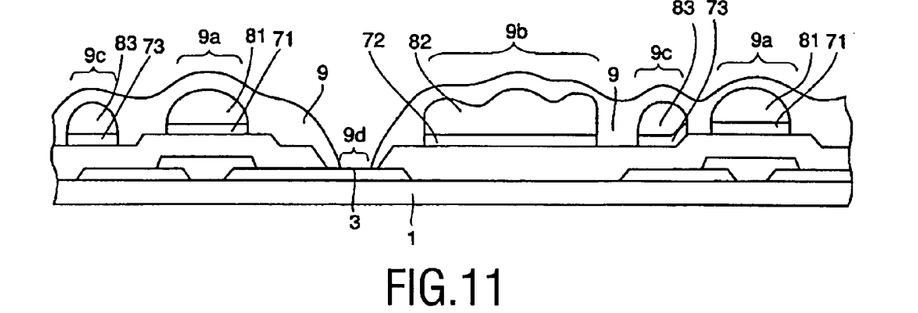
FIG. 11 is a cross-sectional view of the substrate on which the photosensitive film has been formed.

FIG. 11 is a cross-sectional view of the substrate on which the photosensitive film has been formed.

The photosensitive film 9 comprises a window 9*d* for exposing a part of the drain electrode 3. Since the remaining portions 81, 82 and 83 have been formed below the photosensitive film 9, the photosensitive film 9 is formed at its surface with projections 9*a*, 9*b* and 9*c*, reflecting the shape of the remaining portions 81, 82 and 83. By these projections 9*a*, 9*b* and 9*c*, a gentle undulation is formed over the entire surface of the photosensitive film 9. After forming the photosensitive film 9, a reflective electrode film is formed so as to cover the photosensitive film 9 (see FIG. 12).

Figure 12:
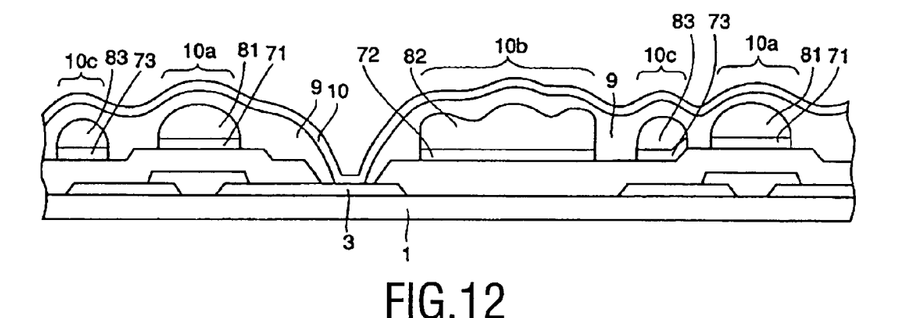
FIG. 12 is a cross-sectional view of the substrate on which the reflective electrode film 10 has been formed.

FIG. 12 is a cross-sectional view of the substrate on which the reflective electrode film 10 has been formed.

Since the window 9*d* (see FIG. 11) has been formed in the photosensitive film 9, the reflective electrode film 10 is connected to the drain electrode 3. Since the photosensitive film 9 has been formed below the reflective electrode film 10, the reflective electrode film 10 reflects the shape of the projections 9*a*, 9*b* and 9*c* (see FIG. 11), so that the reflective electrode film 10 have projections 10*a*, 10*b* and 10*c*. By these projections 10*a*, 10*b* and 10*c*, a gentle undulation is formed over the entire surface of the reflective electrode film 10. After forming the reflective electrode film 10 as described above, the reflective electrode film 10 is divided into pixel areas by performing the lithographic step, so that a reflective electrode 100 (shown by hatching) comprising projections 10*a*, 10*b* and 10*c* is formed in each pixel area as shown in FIGS. 1 and 2. By providing the reflective electrode 100 with the projections, it becomes possible to provide the reflective electrode 100 with a desired reflective characteristic. In this embodiment, each reflective electrode 100 is formed so as to extend not only on a region in which the remaining portions 83 have been formed but also on a region in which the remaining portions 81 and 82 have been formed (see FIG. 2), but the reflective electrode 100 may be formed, for example, only on the region in which the remaining portions 83 have been formed.

In this embodiment, the portions 81, 82 and 83 are remained by patterning the photosensitive film 8 and the metal film 7 is etched using the remaining portions 81, 82 and 83 as etching masks. By making the remaining portions 81 and 82 act as etching masks, the gate electrode 71 and the gate bus 72 are formed, and by making the remaining portion 83 act as an etching mask, the metal piece 73 is formed. Since each remaining portion 83 is separated from the remaining portions 81 and 82, each metal piece 73 is separated from the gate electrode 71 and the gate bus 72. The remaining portions 81, 82 and 83 are not removed and the photosensitive film 9 is formed so as to cover the remaining portions 81, 82 and 83, and then the reflective electrode film 10 is formed on the photosensitive film 9. The reflective electrode film 10 follows the shape of the photosensitive film 9 and thus has the projections 10*a*, 10*b* and 10*c*. As described above, in this embodiment, when the photosensitive film 8 is etched, each remaining portion 83 which plays a role in providing the reflective electrode 100 with projections is also formed in addition to the remaining portions 81 and 82 which play roles as etching masks for forming the gate electrode 71 and the gate bus 72, respectively. Therefore, there is no need to form, from different photosensitive films, a member used as etching mask for forming the gate electrode 71 and the gate bus 72 and another member for providing the reflective electrode 100 with projections, so that the number of manufacturing steps and the manufacturing costs will be reduced. Hereinafter, the manner in which the manufacturing step number and the manufacturing costs are reduced will be described in comparison with the conventional way.

Figure 13:
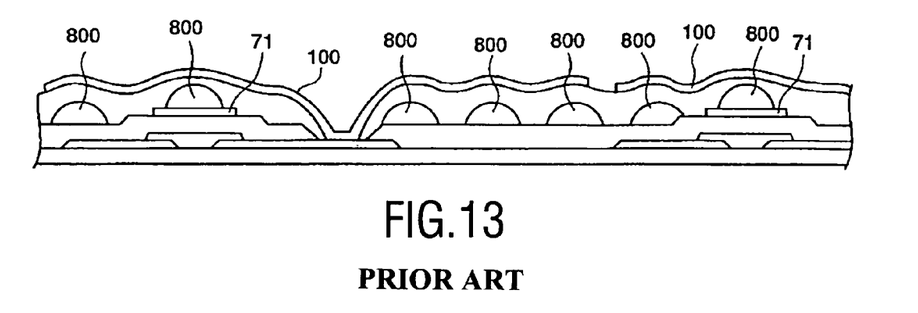
FIG. 13 is a cross-sectional view of the conventional substrate on which TFTs and reflective electrodes have been formed.

FIG. 13 is a cross-sectional view of the conventional substrate on which TFTs and reflective electrodes have been formed.

Conventional way requires that, after a metal film for gate electrodes and gate buses is formed, the metal film is patterned by performing a lithographic step to form the gate electrodes 71 and the gate buses (not shown), and after a photosensitive film is formed, a plurality of portions 800 are remained by exposing the photosensitive film to light and developing it. Therefore, it is required that an etching mask for patterning the metal film and the remaining portions 800 for providing the reflective electrode 100 with projections must be formed from different photosensitive films. In contrast, in that embodiment according to the present invention, the remaining portions 81 and 82 which play roles as etching masks for forming the gate electrode 71 and the gate bus 72, respectively, and the remaining portion 83 which plays a role in providing the reflective electrode 100 with projections are formed from the same photosensitive film 8. Therefore, it will be appreciated that the number of manufacturing steps and the manufacturing costs are reduced in the present invention.

In this embodiment, the edges 82*a* of the remaining portion 82 is formed in the wavy shape. By forming the edges 82*a* in the wavy shape, the shape of the projections 10*b* of the reflective electrode 100 reflects the wavy shape of the edges 82*a*, so that the reflective characteristics of the reflective electrode 100 can be further improved. It is noted that the edges 82*a* of the remaining portions 82 may have a straight shape instead of the wavy shape if the reflective electrode can obtain a desired reflective characteristic.

In this embodiment, the metal film 7 is of the single layer structure but the film 7 may be of the multilayer structure consisting of a plurality of layers such as Al (aluminum) film/Mo (molybdenum) film. By forming the film 7 in the multilayer structure, it becomes possible that the gate electrode 71 and the gate bus 72 comprise a multilayer structure having two or more layers.

In this embodiment, the remaining portion 83 is formed in the hemispherical shape but the portion 83 may be formed in a shape other than the hemispherical shape. Hereinafter, one example in which the remaining portion is formed in a shape other than the hemispherical shape is described with referencet to FIG. 14.

Figure 14:
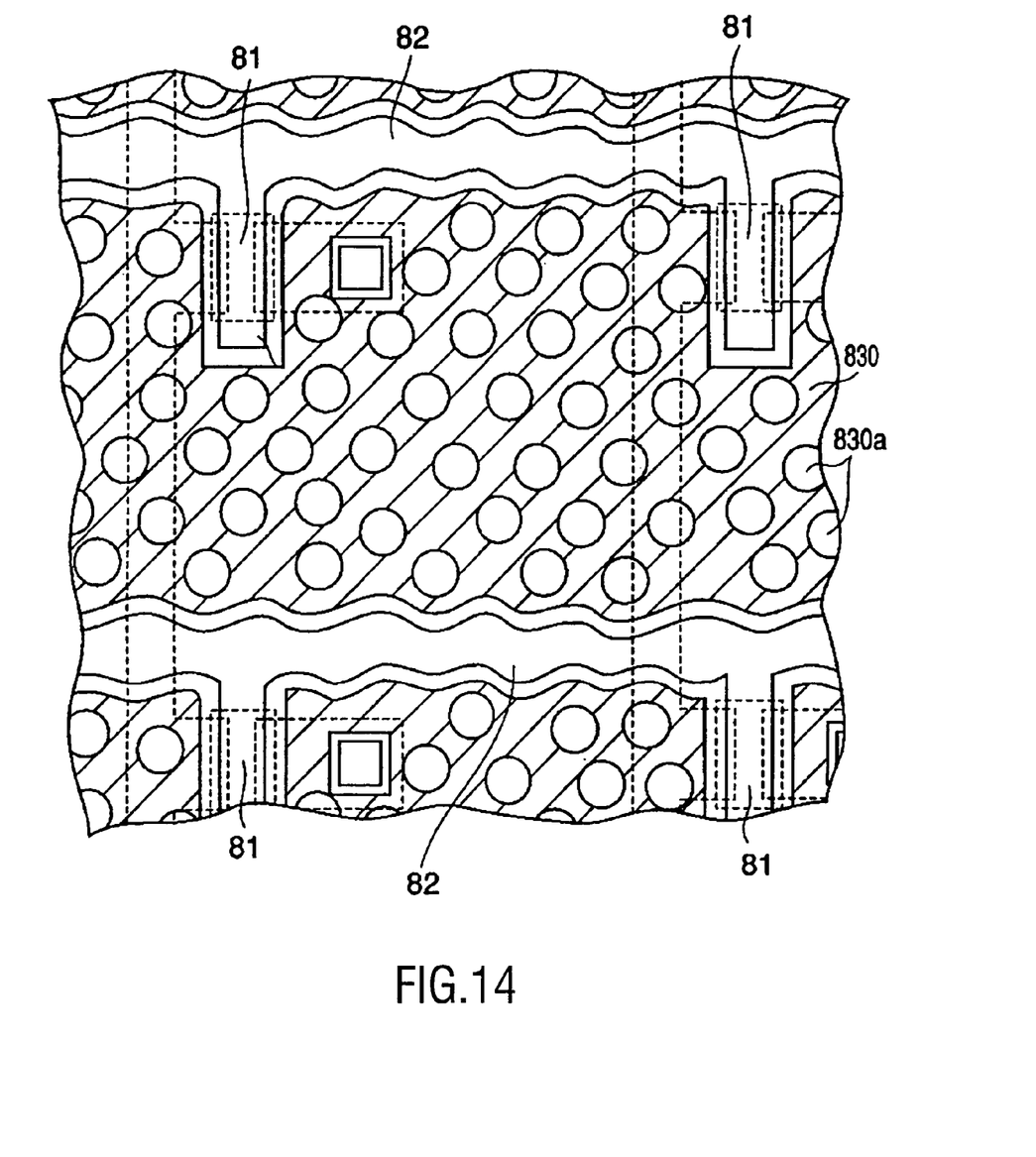
FIG. 14 is a plan view of the substrate on which remaining portions 830 have mesh pattern.

FIG. 14 is a plan view of the substrate on which remaining portions 830 have mesh pattern.

In order to form the remaining portion 830 in the mesh pattern, after the photosensitive film 8 is formed (see FIG. 6), a plurality of holes 830*a* may be formed in the photosensitive film 8. In this way, the remaining portion 830 having the mesh pattern (shown by hatching) is formed in addition to the remaining portions 81 and 82. In the case where the remaining portion 830 having the plurality of holes 830*a* is formed instead of making the plurality of hemispherical shaped remaining portions 83 distribute, the reflective electrode 100 reflects the shape of the plurality of holes 830a, so that the electrode 100 has recesses instead of the projections 10c (see FIG. 12). By providing the reflective electrode 100 with the recesses, it is also possible to provide the reflective electrode 100 with a desired reflective characteristic. It is noted that the remaining portion 830 is formed so as to be separated from the remaining portions 81 and 82 in FIG. 14 but the remaining portion 830 may be formed so as to be connected, for example, to the remaining portion 82.

According to the present invention, there are provided a method of forming a TFT and an electrode comprising recesses or projections with reduced number of manufacturing steps and reduced costs and a liquid crystal display device to which such method is applied.

The invention claimed is:

1. A liquid crystal display device comprising a substrate on which a TFT and a reflective electrode having recesses or projections are formed in a predetermined area, wherein the reflective electrode is formed by using a method of forming at least a gate electrode and a gate bus by processing a first film, and comprising:
    forming the first film;
    forming a photosensitive film on the first film;
    patterning the photosensitive film in such a way that a first portion, a second portion and a third portion of the photosensitive film remain,
        the first portion corresponding to the gate electrode,
        the second portion corresponding to the gate bus and
        the third portion being different from the first and second portions;
    etching the first film by using the first, second and third portions as masks; and
    forming the reflective electrode in such a way that at least a portion of the reflective electrode is present on at least the third portion.

2. The device of claim 1, wherein an edge of the second portion comprises a curved form.

3. The device of claim 1, wherein an edge of at least that portion of the gate bus, which is located below the reflective electrode, comprises a curved form.

4. The device of claim 1, wherein the third portion comprises a plurality of parts scattered in the predetermined area.

5. The device of claim 4, wherein an edge of the second portion comprises a curved form.

6. The device of claim 1, wherein the third portion comprises a plurality of holes in the predetermined area.

7. The device of claim 6, wherein en edge of the second portion comprises a curved form.

8. The device of claim 1, wherein the third portion is present below the reflective electrode, and a material of the first film is present below the third portion.

9. The liquid crystal display device of claim 8, wherein an edge of at least that portion of the gate bus that is located below the reflective electrode comprises a curved form.

10. The device of claim 8, wherein an edge of at least that portion of the gate bus, which is located below the reflective electrode, comprises a curved form.

11. A substrate on which a TFT and a reflective electrode having recesses or projections are formed in a predetermined area, the substrate further comprising:

a first film patterned to comprise a first portion, a second portion and a third portion,
    the first portion forming a gate electrode of the TFT,
    the second portion forming a gate bus,
    the third portion being different from the first and the second portion, and
    at least the third portion being formed in the predetermined area;
provided on the substrate provided with the first film,
    a photosensitive film patterned to comprise a first photosensitive portion,
    a second photosensitive portion and
    a third photosensitive portion,
        the first portion being masked by and aligned with the first photosensitive portion,
        the second portion being masked by and aligned with the second photosensitive portion, and
        the third portion being masked by and aligned with the third photosensitive portion;
provided on the substrate provided with the photosensitive film,
    a reflective electrode covering at least the third photosensitive portion and an area of the substrate adjacent the third photosensitive portion, to form the reflective electrode having recesses or projections in a predetermined area.

12. A liquid crystal display device comprising a substrate on which a TFT and a reflective electrode having recesses or projections are formed in a predetermined area, the substrate further comprising:

a first film patterned to comprise a first portion, a second portion and a third portion,
    the first portion forming a gate electrode of the TFT,
    the second portion forming a gate bus,
    the third portion being different from the first and the second portion, and
    at least the third portion being formed in the predetermined area;
provided on the substrate provided with the first film,
    a photosensitive film patterned to comprise a first photosensitive portion,
    a second photosensitive portion and
    a third photosensitive portion,
        the first portion being masked by and aligned with the first photosensitive portion,
        the second portion being masked by and aligned with the second photosensitive portion, and
        the third portion being masked by and aligned with the third photosensitive portion;
provided on the substrate provided with the photosensitive film,
    a reflective electrode covering at least the third photosensitive portion and an area of the substrate adjacent the third photosensitive portion, to form the reflective electrode having recesses or projections in a predetermined area.

* * * * *